(12) United States Patent
Lee

(10) Patent No.: US 11,536,072 B2
(45) Date of Patent: Dec. 27, 2022

(54) ASSISTANCE APPARATUS FOR OPENING AND CLOSING SCISSOR DOOR FOR VEHICLE

(71) Applicants: Hyundai Motor Company, Seoul (KR); Kia Motors Corporation, Seoul (KR)

(72) Inventor: Jae Seung Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 678 days.

(21) Appl. No.: 16/545,635

(22) Filed: Aug. 20, 2019

(65) Prior Publication Data

US 2020/0325714 A1     Oct. 15, 2020

(30) Foreign Application Priority Data

Apr. 12, 2019   (KR) .......................... 10-2019-0042836

(51) Int. Cl.
| | |
|---|---|
| *E05F 11/00* | (2006.01) |
| *E05F 11/54* | (2006.01) |
| *E05F 11/04* | (2006.01) |
| *B60J 5/04* | (2006.01) |

(52) U.S. Cl.
CPC .............. *E05F 11/54* (2013.01); *E05F 11/04* (2013.01); *B60J 5/0472* (2013.01); *E05Y 2900/531* (2013.01)

(58) Field of Classification Search
CPC .. E05F 11/54; E05F 13/02; E05F 11/04; B60J 5/0472
USPC ........................................................... 49/324
See application file for complete search history.

(56) References Cited

U.S. PATENT DOCUMENTS

| | | | | |
|---|---|---|---|---|
| 3,206,186 A | * | 9/1965 | Thomas ................. | E05F 11/54 49/272 |
| 7,328,933 B2 | * | 2/2008 | Vitale .................... | E05F 11/04 296/146.4 |

FOREIGN PATENT DOCUMENTS

| | | | | |
|---|---|---|---|---|
| GB | 2155541 A | * | 9/1985 | ............. E05F 11/02 |
| KR | 101802149 B1 | * | 11/2017 | ............. E05F 11/54 |

\* cited by examiner

*Primary Examiner* — Daniel J Troy
*Assistant Examiner* — Daniel Alvarez
(74) *Attorney, Agent, or Firm* — Fox Rothschild LLP

(57) ABSTRACT

An assistance apparatus for opening and closing a scissor door for a vehicle includes: a door hinge having one side installed at a vehicle body to be rotated vertically through a hinge shaft, and having a door mounted at an opposite side thereof; a gas lifter having a first side installed at the vehicle body, and having a second side installed at the door hinge to assist a rotational force of the door hinge or keep a posture thereof through compression and elongation; and an opening and closing assistance unit for providing the rotational force to the door hinge in interlocking with the pressing operation of a vehicle passenger.

4 Claims, 4 Drawing Sheets

ASSISTANCE APPARATUS FOR OPENING AND CLOSING SCISSOR DOOR FOR VEHICLE

CROSS REFERENCE TO RELATED APPLICATION

The present application claims under 35 U.S.C. § 119(a) the benefit of Korean Patent Application No. 10-2019-0042836 filed on Apr. 12, 2019, the entire contents of which are incorporated by reference herein.

BACKGROUND

(a) Technical Field

The present disclosure relates to an assistance apparatus for opening and closing a scissor door for a vehicle, more particularly, to the assistance apparatus capable of assisting a closing operation of the scissor door by a passenger pressing his/her foot.

(b) Description of the Related Art

Various kinds of doors may be installed in a vehicle.

The most common type of vehicle door is a regular swing door that is opened or closed by being pushed or pulled horizontally with respect to the ground. The regular door has a structure that prevents the door from being opened while the vehicle is traveling, which is advantageous in that the vehicle can travel in a stable manner. However, there is a disadvantage that a lot of space is required to open the door because the door is opened horizontally with respect to the ground when the door is opened.

In order to solve the disadvantage of the regular door, various types of doors have been developed, one of which is a scissor door.

The scissor door refers to the manner of opening and closing the door, which is like scissors, and has an advantage in that the door is raised upward vertically with respect to the ground when the door is opened so that the door is capable of being opened and closed even in a narrow space.

FIG. 1 (RELATED ART) is a diagram illustrating a conventional apparatus for opening and closing a scissor door.

As illustrated in FIG. 1, a conventional apparatus for opening and closing a scissor door includes a door hinge 40 installed so that a door 20 rotates in a direction perpendicular to the ground to be opened and closed from a vehicle body 10; and a gas lifter 50 installed on the door hinge 40 to assist a rotational force of the door hinge 40 or keep a posture thereof through compression and elongation.

In particular, the door hinge 40 is installed to the vehicle body through a hinge shaft 41, and accurately installed by an upper hinge body 30 fixed to the vehicle body 10. Then, one side of the gas lifter 50 is installed to the vehicle body 10, and accurately installed by a lower hinge body 60 fixed to the vehicle body 10.

Therefore, when the door 20 is opened, the door 20 is rotated integrally with the door hinge 40 upwards around the hinge shaft 41. In particular, it is possible to open the door 20 even with less force while assisting the gas lifter 50 to rotate the door hinge 40. Then, the posture is kept by the gas lifter 50 in a state where the door 20 has been opened.

Conversely, when the door 20 is closed, the door 20 is rotated integrally with the door hinge 40 downwards around the hinge shaft 41, as opposed to opening the door 20.

Likewise, the door 20 is prevented from being closed while being rotated at a high speed by its own weight while assisting the gas lifter 50 to rotate the door hinge 40.

Meanwhile, since the state where the door has been opened is a state where the door 20 has been rotated upwards at a position close to the vehicle body, it has been inconvenient for a passenger who rides inside the vehicle to extend his/her arm to rotate the door for closing the door, and particularly, it has been inconvenient to close the door only because it may require an excessive force for closing the door.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides an apparatus for opening and closing a scissor door for a vehicle capable of assisting a closing operation of the scissor door by a passenger pressing his/her foot.

An assistance apparatus for opening and closing a scissor door for a vehicle according to an embodiment of the present disclosure includes a door hinge having one side installed at a vehicle body to be rotated vertically through a hinge shaft, and having a door mounted at an opposite side thereof; a gas lifter having a first side installed at the vehicle body, and having a second side installed at the door hinge to assist a rotational force of the door hinge or keep a posture thereof through compression and elongation; and an opening and closing assistance unit for providing the rotational force to the door hinge in interlocking with the pressing operation of a vehicle passenger.

The opening and closing assistance unit includes a hinge gear installed at the hinge shaft and rotated integrally with the door hinge; a foot lever rotated by the pressing operation of the vehicle passenger; and a belt for interlocking the rotation operation of the foot lever with the hinge gear.

The vehicle body is installed with an upper hinge body having the one side of the door hinge installed thereon, and a lower hinge body having the first side of the gas lifter installed thereon, and the hinge gear is installed at the upper hinge body through the hinge shaft.

The opening and closing assistance unit further includes an upper belt gear installed at the upper hinge body and engaged with the hinge gear to be interlocked with each other, and for receiving a rotational force of the belt by supporting a first side of the belt; and a lower belt gear installed to support a second side of the belt and for transferring the rotation of the foot lever to the upper belt gear through the belt.

The foot lever has both sides divided with respect to the rotary shaft, has a gear connection part for rotating the lower belt gear provided at one side thereof, and has a pressing part for receiving the pressing operation of the vehicle passenger provided at an opposite side thereof.

The gear connection part is provided in the form of a rack gear, and the lower belt gear is provided in the form of a pinion gear engaged with the gear connection part.

According to an embodiment of the present disclosure, it is possible to easily close the door using the assistance apparatus by which the passenger may rotate the scissor door downwards in the state where the scissor door has been opened.

In addition, it is possible to solve the problem caused by the fact that the passenger's hand does not reach the door when the door has been opened.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
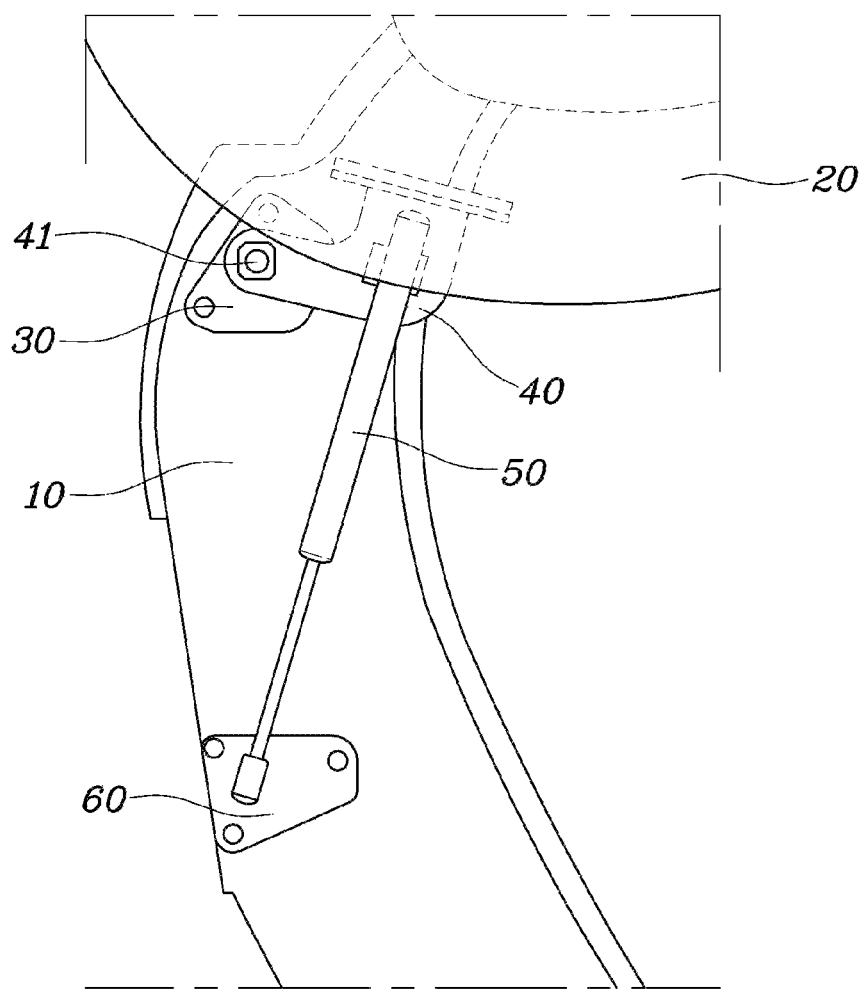
FIG. 1 (RELATED ART) is a diagram illustrating a conventional apparatus for opening and closing a scissor door.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in more detail with reference to the accompanying drawings. However, the present disclosure is not limited to the embodiments disclosed below but can be implemented in various forms differently from each other and rather, these embodiments are provided so that the present disclosure will be thorough and complete and to completely convey the scope of the disclosure to those skilled in the art. The same reference numerals refer to the same elements in the drawings.

Figure 2:
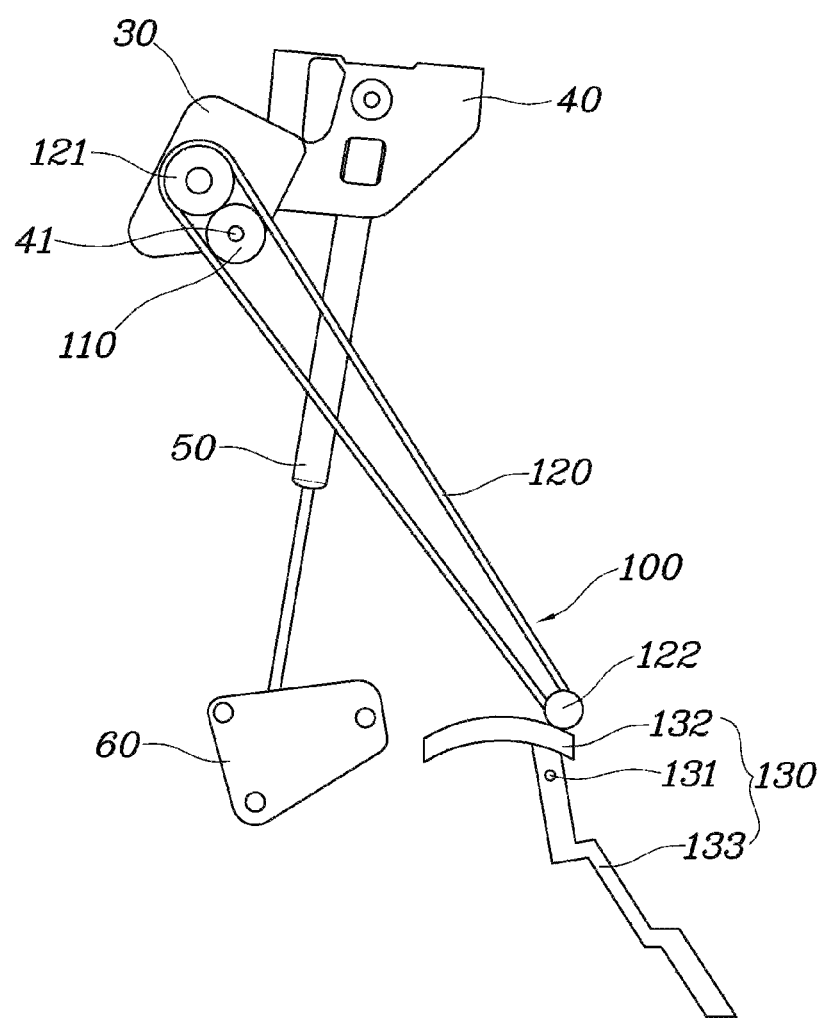
FIG. 2 is a diagram illustrating an assistance apparatus for opening and closing a scissor door for a vehicle according to the present disclosure.

FIG. 2 is a diagram illustrating an assistance apparatus for opening and closing a scissor door for a vehicle according to the present disclosure.

As illustrated in FIG. 2, an assistance apparatus for opening and closing a scissor door for a vehicle according to an embodiment of the present disclosure is configured to rotate a door 20 downwards when a closing operation is performed in a state where the door 20 has been opened, and includes a door hinge 40 having one side installed at the vehicle body 10 to be rotated vertically through the hinge shaft 41, and having the door 20 mounted at an opposite side thereof; the gas lifter 50 having a first side installed at the vehicle body 10 and having a second side installed at the door hinge 40 to assist the rotational force of the door hinge 40 or keep the posture thereof through compression and elongation; and an opening and closing assistance unit 100 for providing the rotational force to the door hinge 40 in interlocking with the pressing operation of the vehicle passenger.

The door hinge 40 is configured for rotatably installing the door 20 that is opened or closed while being rotated vertically to the vehicle body 10, and the door 20 is integrally rotated vertically by the rotation of the door hinge 40 as the end portion of the door 20 is fixed to the door hinge 40. For example, the door hinge 40 and the hinge shaft 41 are fixed by a separate fixing pin (not illustrated) and integrally rotated.

In particular, the door hinge 40 is installed to the hinge shaft 41 installed to the vehicle body 10, and fixed to the hinge shaft 41 so as to be integrally rotated with the rotation of the hinge shaft 41.

Meanwhile, the hinge shaft 41 is installed at the upper hinge body 30 fixed to the vehicle body 10, and rotatably installed while being supported by the upper hinge body 30.

The gas lifter 50 is configured to assist a rotational force of the door hinge 40 or maintain the posture thereof in a state where the door has been rotated upwards through compression and elongation, and produced in the form where gas has been charged in a cylinder. In particular, the first side of the gas lifter 50 is installed by the lower hinge body 60 fixed to the vehicle body 10, and the second side thereof is fixed to the door hinge 40.

The opening and closing assistance unit 100 enables an operation of closing the door 20 by rotating the door hinge 40 by using a force at which the vehicle passenger presses his/her foot to rotate the door 20, which is a state where it has been rotated and opened upwards, downwards.

For this purpose, the opening and closing assistance unit 100 includes a hinge gear 110 installed at the hinge shaft 41 and rotated integrally with the door hinge 40; a foot lever 130 rotated by the pressing operation of the vehicle passenger; and a belt 120 for interlocking the rotation operation of the foot lever 130 with the hinge gear 110.

In particular, the belt 120 keeps tension by having a first side supported by an upper belt gear 121 and having a second side supported by a lower belt gear 122 in order to transfer a rotational force of the foot lever 130 to the hinge gear 110.

The hinge gear 110 is fixed to the hinge shaft 41 in the form of a spur gear having gear teeth formed on the outer circumferential surface thereof. Therefore, the hinge shaft 41 is provided to be integrally rotated by the rotation of the hinge gear 110.

The foot lever 130 is configured to be pressed directly by the vehicle passenger to provide the rotational force, has both sides divided with respect to a rotary shaft 131 installed at the vehicle body, has a gear connection part 132 for rotating the lower belt gear 122 provided at one side thereof, and has a pressing part 133 for receiving the pressing operation of the vehicle passenger provided at an opposite side thereof.

The belt 120 is configured to transfer the rotational force to the hinge gear 110 when the vehicle passenger presses the pressing part 133 of the foot lever 130 to rotate the foot lever 130.

The upper belt gear 121 is installed at the upper hinge body 30 and engaged with the hinge gear 110 to be interlocked with each other.

The lower belt gear 122 is engaged with the gear connection part 132 and rotates in interlocking with the case where the gear connection part 132 is rotated to rotate the belt 120.

For this purpose, it is preferable that the gear connection part 132 is provided in the form of a rack gear, and the lower belt gear 122 is provided in the form of a pinion gear engaged with the gear connection part 132.

An operating state of the assistance apparatus for opening and closing the scissor door for the vehicle according to an embodiment of the present disclosure configured as described above will be described with reference to FIGS. 3 and 4.

Figure 3:
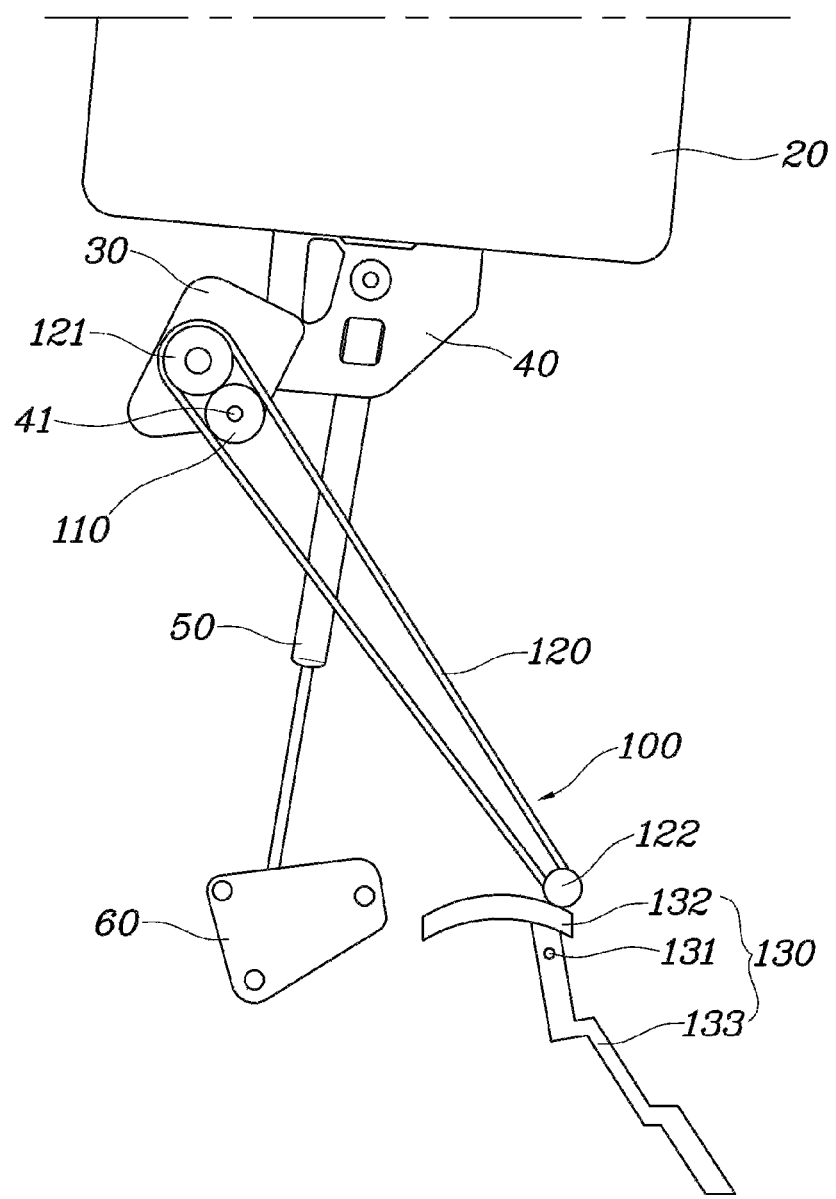
FIGS. 3 and 4 are diagrams illustrating operating states of the assistance apparatus for opening and closing the scissor door for the vehicle according to the present disclosure.
Figure 4:
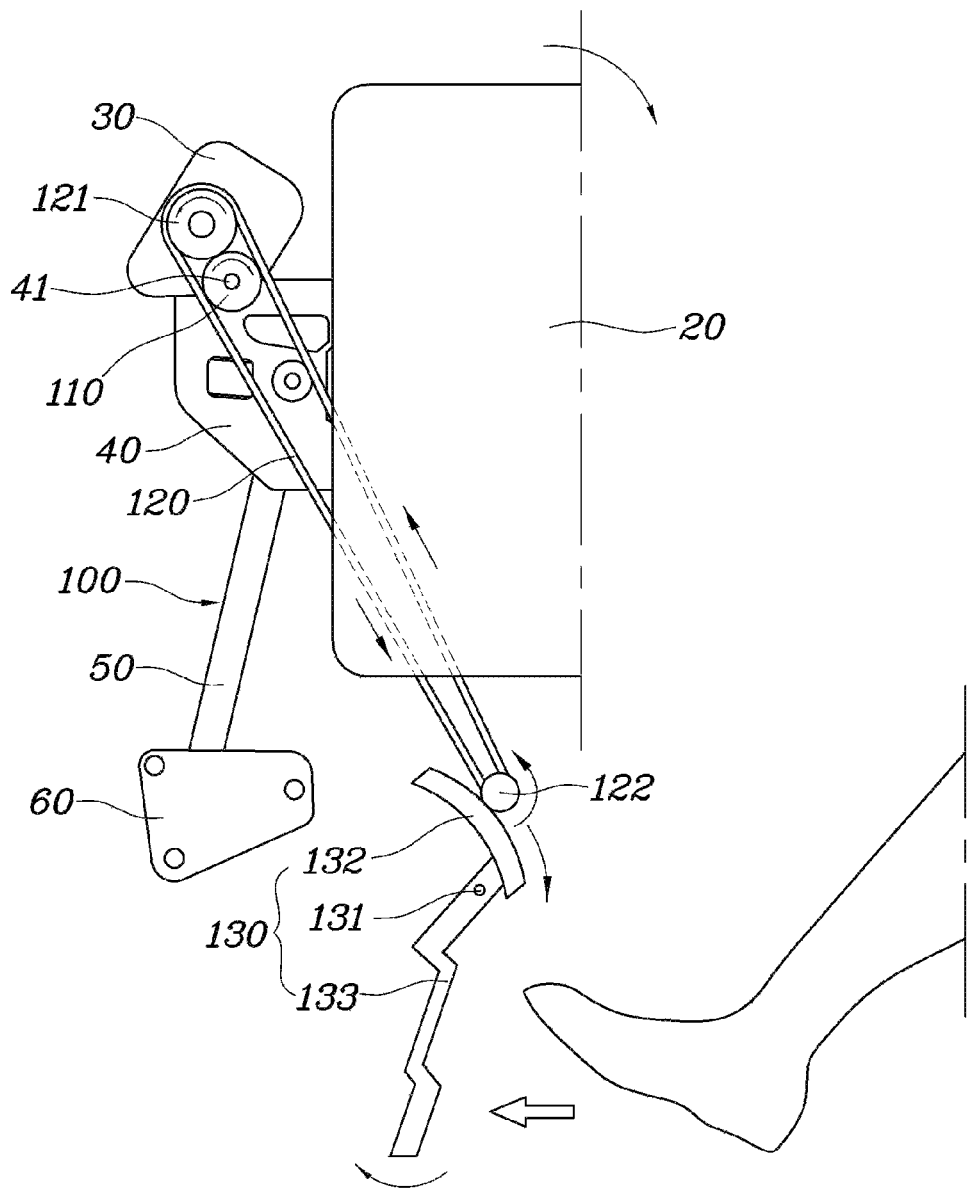

FIGS. 3 and 4 are diagrams illustrating operating states of the assistance apparatus for opening and closing the scissor door for the vehicle according to the present disclosure.

FIG. 3 is a diagram illustrating a state where the door has been opened, and FIG. 4 is a diagram illustrating a state where the door is closed.

As shown in FIG. 3, in a state where the door 20 has been opened, the door 20 is rotated upwards and the posture thereof is kept by the gas lifter 50.

As described above, in order for the passenger to close the door 20 in a state that the door 20 has been opened, the passenger should rotate the door 20 by extending his/her arm to hold the door 20 and then applying the load downwards.

However, according to an embodiment of the present disclosure, the passenger presses the pressing part 133 of the foot lever 130 using his/her foot as in FIG. 4, before extending his/her arm to hold the door 20 and rotating it downwards in order to close the door 20.

Then, the foot lever 130 rotates the gear connection part 132 by the pressing of the pressing part 133 with respect to the rotary shaft 131.

When the gear connection part 132 is rotated, the lower belt gear 122 is rotated in interlocking therewith, thereby rotating the belt 120.

Therefore, the pressing force of the passenger transferred to the belt 120 rotates the upper belt gear 121 by the rotation of the belt 120, and the hinge gear 110 is rotated in interlocking with the rotation of the upper belt gear 121 to integrally rotate the hinge shaft 41.

The door 20 is closed by being integrally rotated downwards together with the door hinge 40 by the rotation of the hinge shaft 41.

Therefore, it is possible for the passenger to perform the operation of pressing the foot lever 130 using his/her foot in the state where the door 20 has been opened, thereby closing by rotating the door 20 downwards even without extending his/her arm to directly hold the door 20.

While the present disclosure has been described with reference to the accompanying drawings and the above-described preferred embodiments, the present disclosure is not limited thereto, and is limited by the claims described later. Therefore, those skilled in the art may deform and modify the present disclosure variously within the scope of the technical spirit of the claims described later.

What is claimed is:

1. An assistance apparatus for opening and closing a scissor door for a vehicle including a vehicle body and the scissor door disposed in the vehicle body, comprising:
    a door hinge having one side installed at the vehicle body to be rotated vertically through a hinge shaft, and having the scissor door mounted at an opposite side thereof;
    a gas lifter having a first side installed at the vehicle body, and having a second side installed at the door hinge to assist a rotational force of the door hinge or keep a posture thereof through compression and elongation; and
    an opening and closing assistance unit for providing the rotational force to the door hinge in interlocking with a pressing operation of a vehicle passenger, and including an upper belt gear and a lower belt gear spaced apart from each other along the vehicle body and a foot lever rotated by the pressing operation of the vehicle passenger
    wherein the foot lever has both sides divided with respect to a rotary shaft installed at the vehicle body, has a gear connection part for rotating the lower belt gear provided at one side thereof, and has a pressing part for receiving the pressing operation of the vehicle passenger provided at an opposite side thereof.

2. The assistance apparatus for opening and closing the scissor door for the vehicle according to claim 1, wherein the opening and closing assistance unit further comprises:
    a hinge gear installed at the hinge shaft and rotated integrally with the door hinge; and
    a belt for interlocking the rotation operation of the foot lever with the hinge gear.

3. The assistance apparatus for opening and closing the scissor door for the vehicle according to claim 2,
    wherein the vehicle body is installed with an upper hinge body having the one side of the door hinge installed thereon, and a lower hinge body having the first side of the gas lifter installed thereon,
    wherein the hinge gear is installed at the upper hinge body through the hinge shaft; and
    wherein the opening and closing assistance unit further comprises:
    the upper belt gear installed at the upper hinge body and engaged with the hinge gear to be interlocked with the each other, and for receiving a rotational force of the belt by supporting a first side of the belt; and
    the lower belt gear installed to support a second side of the belt and for transferring the rotation of the foot lever to the upper belt gear through the belt.

4. The assistance apparatus for opening and closing the scissor door for the vehicle according to claim 1, wherein the gear connection part is provided in the form of a rack gear, and the lower belt gear is provided in the form of a pinion gear engaged with the gear connection part.

\* \* \* \* \*